United States Patent [19]

Barringer

[11] Patent Number: 4,862,591

[45] Date of Patent: Sep. 5, 1989

[54] ICE SPUD

[76] Inventor: Richard C. Barringer, 20564 One Mile Rd., Morley, Mich. 49336

[21] Appl. No.: 143,467

[22] Filed: Jan. 12, 1988

[51] Int. Cl.$^4$ .............................................. F25C 5/14
[52] U.S. Cl. ...................................... 30/164.8; 30/315
[58] Field of Search .................. 30/164.5, 164.6, 164.7, 30/164.8, 305, 315, 351, 366, 367; 294/49, 61

[56] References Cited

U.S. PATENT DOCUMENTS

| | | |
|---|---|---|
| 73,809 | 1/1868 | Hoyt . |
| 143,957 | 10/1873 | Boynton et al. . |
| 189,196 | 4/1877 | Crawford . |
| 314,723 | 3/1885 | Rogers . |
| 747,981 | 12/1903 | Kingsley .................... 30/164.7 X |
| 766,558 | 12/1903 | Wagner . |
| 1,094,569 | 4/1914 | Hughes . |
| 2,378,459 | 6/1945 | Beardsley .................... 294/49 X |
| 3,305,984 | 2/1967 | Borcuk ........................ 30/164.8 |

FOREIGN PATENT DOCUMENTS 18102 of 1910 United Kingdom .................. 30/315

Primary Examiner—Frank T. Yost
Assistant Examiner—Michael D. Folkerts
Attorney, Agent, or Firm—Varnum, Riddering, Schmidt & Howlett

[57] ABSTRACT

An ice spud is provided with a blade having cutting means which comprises a pair of spikes and a cutting edge defining a notch in an end of the blade, the cutting edge intersecting lateral edges of the blade to define the spikes therewith, whereby the spikes are spaced from one another without obstruction therebetween and each of the spikes terminates in a cutting point at the respective lateral edge.

15 Claims, 1 Drawing Sheet

ICE SPUD

BACKGROUND OF THE INVENTION

This invention relates to ice spuds, and more particularly, to an improved spud for forming fishing holes in ice which is at least sufficiently thick to support the weight of a fisherman and his equipment.

An ice spud traditionally comprises a flat blade and an elongate handle joined to the blade at the upper end thereof. At its lower end the blade is provided with cutting means. The cutting means has taken one of three conventional forms, namely (a) the lower end of the blade has been beveled to form a straight cutting edge in the manner of a chisel, (b) the blade has been spade-shaped, whereby the cutting edge terminates in a single, centrally disposed cutting point, or (c) the lower end of the blade has been serrated to form a plurality of cutting teeth. None of these forms permits a fishing hole to be cut as quickly and easily as fishermen wish, and such spuds have largely been replaced by hand-driven and, more recently, motor-driven augers.

SUMMARY OF THE INVENTION

In the ice spud according to the present invention, a flat blade is provided with opposed lateral edges, opposed upper and lower ends extending between the lateral edges, opposed front and rear surfaces bounded by the lateral edges and the upper and lower ends, and cutting means at the lower end. The improvement lies particularly in the cutting means which comprises a pair of spikes, and a cutting edge defining a notch in the lower end. The cutting edge is coextensive in width with the lower end to intersect the lateral edges and define the spikes therewith. Thus the spikes are widely spaced from one another without obstruction therebetween, each of the spikes terminating in a cutting point at the respective lateral edge.

It will be apparent that, in use, the two spikes strike the ice first. Apparently the relatively wide spacing between them causes the ice to crack cleanly along a substantially vertical plane established by the cutting points, allowing the following portions of the blade to penetrate the ice easily and separate it along the plane of the crack. A spud constructed in accordance with the invention can penetrate ice as much as five inches thick in one stroke and can be used to form, in such ice, a fishing hole approximately eight inches in diameter in only six strokes, as will be explained with greater particularity hereinafter.

Further objects, features and advantages of the invention will be apparent from the ensuing description taken in conjunction with the accompanying drawings.

THE DRAWINGS

THE PREFERRED EMBODIMENTS

Figure 1:
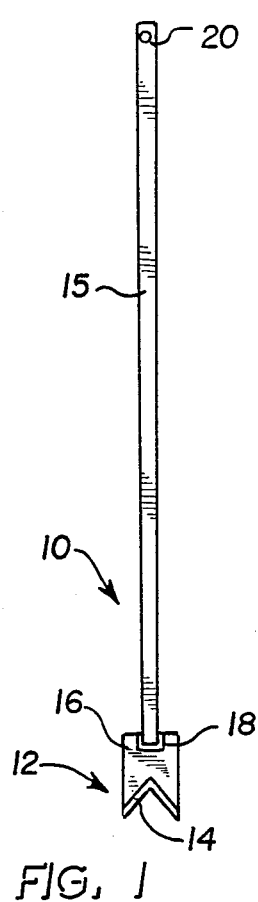
FIG. 1 is a front elevational view of an ice spud according to the invention having a first form of blade.

Referring specifically to FIG. 1, there is shown an ice spud 10 which comprises a flat blade 12 having a cutting means at its lower end 14. A handle 15 is joined to the upper end 16 of the blade by any suitable means, such as welding, the bead of a weld being shown at 18. Handle 15 consists of an elongate steel rod or bar and is preferably pierced at its upper end by a transverse bore 20 which is provided so that a lanyard or wrist loop may be secured to the handle to prevent loss of the spud if it should slip into the water from the hands of the user.

Figure 2:
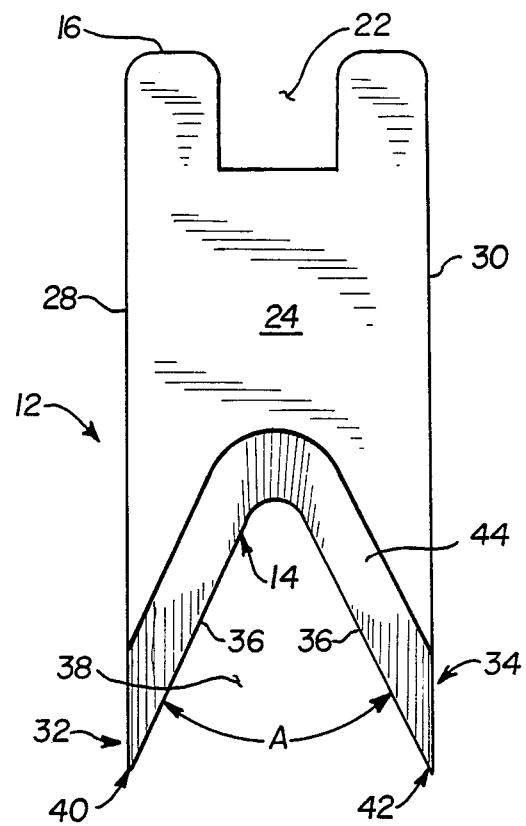
FIG. 2 is a front elevational view, greatly enlarged from that of FIG. 1, of a preferred embodiment of the blade forming an element of an ice spud according to the invention.
Figure 3:
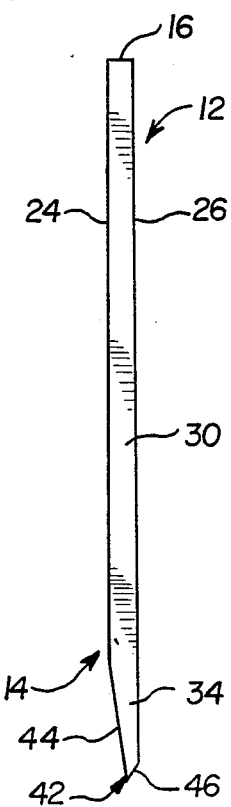
FIG. 3 is a side elevational view of the blade of FIG. 2.
Figure 4:
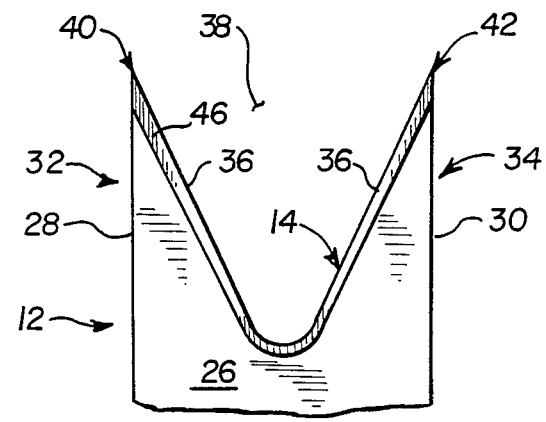
FIG. 4 is a partial view of the blade of FIGS. 2 and 3 in inverted rear elevation.

Referring now to FIGS. 2 to 4, in which elements corresponding to those depicted in FIG. 1 are identified by like reference characters, the preferred embodiment of blade 12 is illustrated. The blade may be cut, for example, from cold-rolled spring steel, or preferably it is forged of carbon steel and hardened.

At upper end 16 of the blade, a rectangular recess 22 is provided to receive an end of the handle. Being flat in form, the blade has two major surfaces which are opposed to one another and which are preferably parallel, namely a front surface 24 and a rear surface 26, both bounded by lateral edges 28 and 30 of the blade and by upper and lower ends 16 and 14 which extend between the lateral edges.

The cutting means comprises a pair of spikes 32 and 34 and a cutting edge 36. The cutting edge defines a notch 38 of V-form in lower end 14 of the blade, the cutting edge being coextensive in width with the lower end and intersecting lateral edges 28 and 30 to define spikes 32 and 34 therewith. It is to be noted that the spikes are thus widely spaced from one another without obstruction between them and that each of the spikes terminates in a cutting point 40, 42 located at the respective lateral edge.

Front surface 24 includes a beveled portion 44 adjacent to notch 38 and forming an angle with the plane of the remainder of the front surface, whereby cutting edge 36 is defined by the intersection of this front beveled portion and rear surface 26. Preferably, the rear surface also includes a beveled portion 46, adjacent to the notch, which forms an angle with the plane of the remainder of the rear surface. In such an embodiment, the cutting edge is thus defined by the intersection of the front and rear beveled portions. It is also to be noted that the width of the front beveled portion is preferably much greater than the width of the rear beveled portion.

A number of the dimensions and proportions of elements of the improved ice spud are important to its performance. Among these is the angle formed by front beveled portion 44 with the plane of the remainder of front surface 24. Performance seems to fall off sharply if this angle is smaller than ten degrees or larger than thirty-five degrees. The preferred angle is approximately 22.5 degrees. If rear beveled portion 46 is provided, the angle it forms with the remainder of rear surface 26 should be in the same range, and like its front counterpart, is preferably about 22.5 degrees.

The thickness of the blade also seems critical to performance and is preferably between three-sixteenths inch and five-sixteenths inch, the most preferred thickness being between these two limits at about a quarter of an inch.

The legs of the V represented by notch 38 describe an angle A which is preferably in the range of forty-five degrees to ninety degrees, best performance being realized when angle A is approximately sixty degrees, as shown in FIGS. 2 and 4. Also, the vertex of the V is preferably rounded in the manner shown in FIGS. 2 and 3.

Lateral edges 28 and 30 are preferably parallel, and the width of the blade is preferably about 2.5 inches throughout. Referring to FIG. 1, handle 15 is preferably formed from stock having a diameter of seven-eighths inch, cut to a preferred length of about four feet, the blade being about six inches long. These dimensions will provide an overall weight of about nine pounds. However, the width of the blade and the weight of the spud can be increased for use with excessively thick ice.

Finally, a sheath (not shown) formed of sheet metal should be used to cover the blade when the spud is not in use.

Operation

Figure 5:
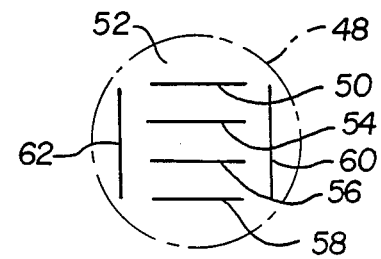
FIG. 5 is a diagramatic plan view illustrating one manner of use of an ice spud according to the invention, but does not depict any part of the ice spud of the invention.

Referring to FIG. 5, which is a diagrammatic view from above the ice, the approximate perimeter of the fishing hole to be formed is indicated by an interrupted line 48. The first stroke with the spud should be effected where indicated at 50. This will remove or loosen a chunk of ice indicated roughly at 52. The second stroke 54 should be parallel with and about two to three inches from the first stroke. The third and fourth strokes 56 and 58 should be executed in order in the manner of the second stroke. Finally, the spud is rotated about its longitudinal axis through a quarter-turn, and the fifth and sixth strokes 60 and 62 are executed, though not necessarily in that order, with the blade held at right angles to the initial four strokes.

The foregoing assumes that the thickness of the ice is about five inches or less, but in any event it will be seen that a hole of appropriate size can be formed in such ice with only six strokes. Ice above about seven inches in thickness requires two strokes in the same spot for the blade to completely penetrate the ice.

It has been found that, using the spud according to the invention, suitable fishing holes can be formed in hard, colder ice as much as eight inches thick in about the same period of time as is required by motor-driven augers.

While the invention has been described in connection with specific embodiments thereof, it will be understood that this is by way of illustration and not of limitation, and that the scope of the appended claims should be construed as broadly as the prior art will permit.

What is claimed is:

1. In an ice spud comprising a relatively wide flat blade and a relatively narrow elongate handle joined thereto, the blade having opposed lateral edges, opposed upper and lower ends extending between the lateral edges, opposed front and rear surfaces bounded by the lateral edges and the upper and lower ends, and cutting means at the lower end, the handle extending longitudinally upwardly from the upper end of the blade, the improvement wherein the cutting means comprises a pair of spikes and a cutting edge defining a notch in the lower end of the blade, the width of the blade being constant, whereby the lateral edges of the blade are parallel, the cutting edge being coextensive in width with the blade to intersect the lateral edges and define the spikes therewith, whereby each of the spikes terminates at the respective lateral edge in a cutting point spaced the full width of the blade from the cutting point in which the other of the spikes terminates, and with no obstruction therebetween.

2. In an ice spud according to claim 1, the further improvement wherein the front surface includes a beveled portion thereof adjacent to the notch and forming an angle with the plane of the remainder of the front surface, whereby the cutting edge is defined by the intersection of the front beveled portion and the rear surface.

3. In an ice spud according to claim 2, the further improvement wherein the rear surface includes a beveled portion thereof adjacent to the notch and forming an angle with the plane of the remainder of the rear surface, whereby the cutting edge is defined by the intersection of the front and rear beveled portions.

4. In an ice spud according to claim 3, the further improvement wherein the width of the front beveled portion is greater than the width of the rear beveled portion.

5. In an ice spud according to claim 2, the further improvement wherein the magnitude of the angle formed by the front beveled portion and the plane of the remainder of the front surface is in the range of ten degrees to thirty-five degrees.

6. In an ice spud according to claim 5, the further improvement wherein the magnitude of the angle formed by the rear beveled portion and the plane of the remainder of the rear surface is in the range of ten degrees to thirty-five degrees.

7. In an ice spud according to claim 2, the further improvement wherein the magnitude of the angle formed by the front beveled portion and the plane of the remainder of the front surface is approximately twenty-two and one-half degrees.

8. In an ice spud according to claim 7, the further improvement wherein the magnitude of the angle formed by the rear beveled portion and the plane of the remainder of the rear surface is approximately twenty-two and one-half, degrees.

9. In an ice spud according to claim 1, the further improvement wherein the maximum thickness of the blade between the front and rear surfaces is in the range of three-sixteenths inch to five-sixteenths inch.

10. In an ice spud according to claim 1, the further improvement wherein the maximum thickness of the blade between the front and rear surfaces is approximately one-fourth inch.

11. In an ice spud according to claim 1, the further improvement wherein the width of the blade at the lower end and the distance between the cutting points are each approximately two and one-half inches.

12. In an ice spud according to claim 1, the further improvement wherein the notch is of V-form, the legs of the V forming an angle in the range of forty-five degrees to ninety degrees.

13. In an ice spud according to claim 1, the further improvement wherein the notch is of V-form, the legs of the V forming an angle of approximately sixty degrees.

14. In an ice spud according to claim 1, the further improvement wherein the notch is of V-form, the vertex of the V being rounded.

15. In an ice spud according to claim 1, the further improvement wherein the length of the handle is approximately four feet.

* * * * *